Dec. 2, 1958  J. S. NEWTON  2,862,608
TROUGHING ROLLER ASSEMBLY FOR BELT CONVEYORS
Filed Oct. 25, 1957
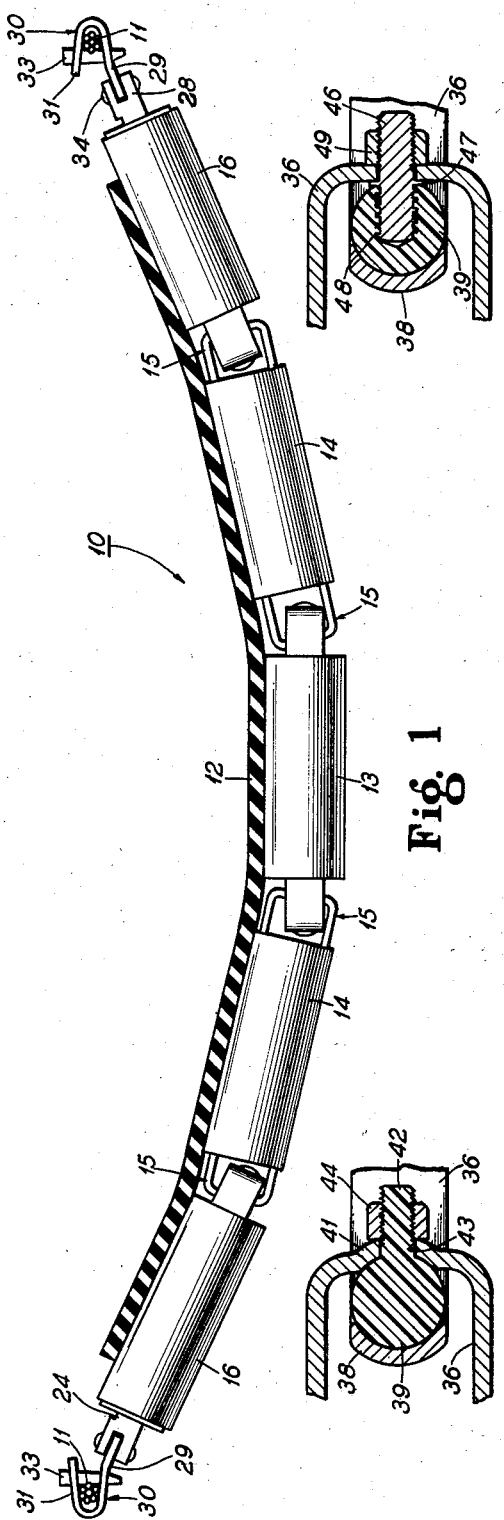
Fig. 1
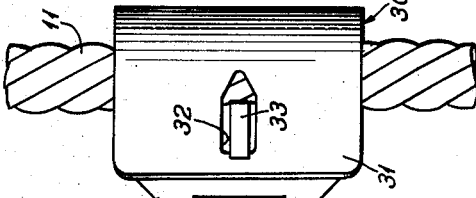
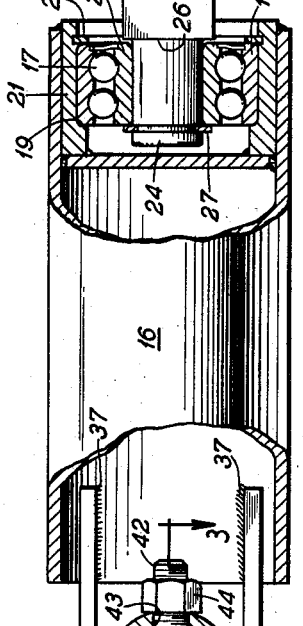
Fig. 2
Fig. 4
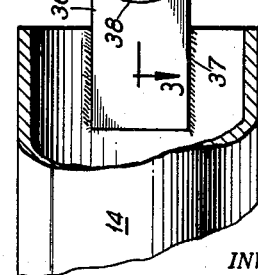
Fig. 3
INVENTOR.
John S. Newton
BY
Murray A. Gleeson
ATTORNEY

2,862,608

TROUGHING ROLLER ASSEMBLY FOR BELT CONVEYORS

John S. Newton, Glen Ellyn, Ill., assignor to Goodman Manufacturing Company, Chicago, Ill., a corporation of Illinois Application October 25, 1957, Serial No. 692,308

4 Claims. (Cl. 198—192)

This invention relates generally to improvements in belt conveyors, and more particularly to an improved troughing roller assembly therefor.

In Lo Presti et al. application Ser. No. 647,718, filed March 13, 1957, for Troughing Roller Assembly for Belt Conveyors, there is shown a troughing roller assembly requiring the use of bearings at the ends only of the assembly, contiguous ends of the rollers of the assembly being connected by interlinking bails having a molded elastomeric cushion therebetween maintained in compression by the load on the rollers, and providing a universal connection so that the rollers can rotate as a unit.

According to the present invention, the connection is made between the contiguous rollers by means requiring no lubrication, capable of withstanding the loads on the rollers, and affording a free universal connection for rotation as a unit. Structure according to the invention makes use of a connection comprising interlocking bails and a ball joint therebetween, the ball of the joint being preferably formed of a tough resinous polymer such as nylon, certain kinds of styrene polymers or the like capable also of withstanding abrasion.

With the foregoing considerations in mind, it is a principal object of this invention to provide an improved connection between the troughing rollers of a troughing roller assembly.

Another object is to provide a troughing roller assembly characterized by interconnected rollers arranged for free articulating and rotating movement, the outer ends of the outer rollers only of the assembly being required to be mounted upon a shaft and bearing.

Other objects and important features of the invention will be apparent from a study of the specification following taken with the drawing which together describe and illustrate a number of preferred embodiments of the invention and what are now considered to be the best modes of practicing the principles thereof. Other embodiments may be suggested to those having the benefit of the teachings herein, and such other embodiments are intended to be reserved especially as they fall within the scope and purview of the subjoined claims.

In the drawing:

Fig. 1 is an elevational view of a troughing roller assembly having the improvements according to the present invention embodied therein;

Fig. 2 is an enlarged elevational view showing details of an interlinking connection for a pair of contiguous rollers of the troughing roller assembly seen in Fig. 1, certain parts of the rollers being shown in broken-away section to show details of the interlinking connection;

Fig. 3 is a sectional view taken along the line 3—3 of Fig. 2 looking in the direction of the arrows; and Fig. 4 is a view similar to Fig. 3 but showing details of another embodiment of the invention seen in Fig. 2.

Referring now to Fig. 1 of the drawings there is shown an improved troughing roller assembly constructed according to the present invention and indicated generally by the reference numeral 10. The troughing roller assembly 10 is suspended between a pair of laterally spaced flexible support strands 11 and supports a conveying reach 12 of a belt conveyor, the load on the conveying reach being transmitted by the troughing roller assembly 10 into the spaced strands 11.

The troughing roller assembly 10 consists of a center load supporting roller 13 flanking inclined wing or troughing rollers 14 and 16, contiguous ends of the rollers being interlinked for rotation as a unit by an articulating connection indicated generally by the reference numeral 15, details of which will be described as this specification proceeds.

The outer end of each of the troughing rollers 16 is provided with a thrust taking bearing 17, an outer race 18 of the bearing 17 being held between a shoulder 19 of a race retainer 21 and a C-ring 22. An inner race 23 of the bearing 17 is arranged to turn on a stub shaft 24, the inner race being retained in position between a shoulder 26 on the stub shaft 24 and a C-ring 27. The outer end of the stub shaft 24 terminates in a clevis 28, the spaced jaws of which receive a tongue 29 of a bracket 30 having an upper limb 31 which together with the tongue 29 and the upper limb 31 afford a means of suspending the troughing roller assembly 10 from one of the spaced strands 11.

The bracket 30 has a pair of aligned apertures 32 therein through which passes a wedge-shaped locking pin 33 which wedges the strand 11 into the bight formed by the upper limb 31 and the tongue 29.

The bracket 30 is articulately connected to the stub shaft 26 for movement in a horizontal plane by means of a pin connection 34.

The inner end of the outer wing roller 16 and each end of the other rollers 13 and 14 are each provided with a bail 36 extending beyond the ends of such rollers. Each of the bails is welded as at 37 to the inner surface of the hollow roller as seen more particularly in Fig. 2.

According to the present invention, bearing means are provided between each of the contiguous bails whereby the rollers may articulate freely and whereby the rollers can rotate together as a unit. The bail 36 of the roller 16 has a dimpled socket 38 therein which receives a ball member 39.

The bail of roller 14 likewise has a socket or dimple 41 formed therein which receives the ball member 39. As seen in Fig. 3 the ball member 39 has a threaded stud 42 extending therefrom and passing through a drilled hole 43 in the bail 36 of the roller 14 and the ball member 39 is held in position against the seat 41 of its bail 36 by means of a nut 44 threaded to the stud 42. The ball member 39 is preferably formed from a resinous polymer having good qualities to resist abrasion and also having good strength in compression. As has been pointed out such material can be nylon and certain kinds of styrene polymers or the like.

The load on the conveying reach 12 is transmitted through the rollers of the troughing roller assembly 10, and the load on the conveying reach 12 imposes a compression load on the ball member 39. The interlocking connections of the bails and the ball members 39 enable all of the rollers of the troughing roller assembly to rotate as a unit, the rollers being connected by what may be broadly considered as a universal connection.

Referring now to Fig. 4 there is shown another form of the invention where only one of the bails 36 need be provided with a ball receiving socket such as the socket referred to by the reference numeral 38. In this form of the invention, the ball member 39 is molded integrally with a metal stud 46 having a flange 47 which bears against the inner face of a bail having the ball receiving socket 38 therein. The stud 46 is provided with several annular flanges 48 whereby the ball can be well bonded during the molding operation to the stud 46. A nut 49 is threaded to the stud 46 and holds the ball member in place, the flange 47 bearing against the inner edge of the bail 36.

From the description foregoing it will be evident that there has been provided an improved construction for a troughing roller assembly whereby only the ends of the outer rollers of the assembly need be supported upon a shaft and bearing, such shafts being directly connected to the bracket whereby the assembly is supported from the rope strand 11. The other rollers of the assembly are freely interlinked by means of the bails 36 and the ball member 39 therebetween, the loads on the conveying reach 11 being transmitted through the rollers along their axis by means of the ball member and bail connections described.

While the invention has been described in terms of a number of preferred embodiments thereof its scope is intended to be limited only by the claims here appended.

I claim as my invention:

1. A troughing roller assembly adapted to support a reach of an endless belt conveyor, said troughing roller assembly comprising a plurality of elongated rollers, means for connecting each end of said troughing roller assembly to a support, means supported on said last named means for rotatably supporting an end roller of said assembly, and means for interconnecting the rollers of said assembly for rotation together but for movement in both horizontal and vertical planes comprising a bail extending from the contiguous ends of a pair of said rollers, said bails being interlinked, a ball supported by one of said bails, and a ball seat on the other of said bails.

2. A troughing roller assembly adapted to support a reach of an endless belt conveyor, said troughing roller assembly comprising a plurality of elongated rollers, means for connecting each end of said troughing roller assembly to a support, means supported on said last named means for rotatably supporting an end roller of said assembly, and means for interconnecting the rollers of said assembly for rotation together but for movement in both horizontal and vertical planes comprising a bail extending from the contiguous ends of a pair of said rollers, said bails being interlinked, a ball supported between said bails, a stud extending from said ball, and opening in one of said bails, and means cooperating with said stud to hold said ball to the said one bail.

3. A troughing roller assembly adapted to support a reach of an endless belt conveyor, said troughing roller assembly comprising a plurality of elongated rollers, means for connecting each end of said troughing roller assembly to a support, means supported on said last named means for rotatably supporting an end roller of said assembly, and means for interconnecting the rollers of said assembly for rotation together but for movement in both horizontal and vertical planes comprising a bail extending from the contiguous ends of a pair of said rollers, said bails being interlinked, a ball supported between said bails, a stud extending from said ball, and opening in one of said bails, and means cooperating with said stud to hold said ball to the said one bail, and a ball seat on the other of said bails.

4. A troughing roller assembly adapted to support a reach of an endless belt conveyor, said troughing roller assembly comprising a plurality of elongated rollers, means for connecting each end of said troughing roller assembly to a support, means supported on said last named means for rotatably supporting an end roller of said assembly, and means for interconnecting the rollers of said assembly for rotation together but for movement in both horizontal and vertical planes comprising a bail extending from the contiguous ends of a pair of said rollers, said bails being interlinked, a ball supported by one of said bails, a stud extending from said ball and passing through an opening in said ball, a flange on said stud, and a nut threaded to said stud and holding said bail to said flange.

References Cited in the file of this patent

UNITED STATES PATENTS 987,157   Messiter _____ Mar. 21, 1911